Aug. 20, 1935.  E. E. HALTEMAN  2,011,681
CALKED PIPE JOINT
Filed March 29, 1934
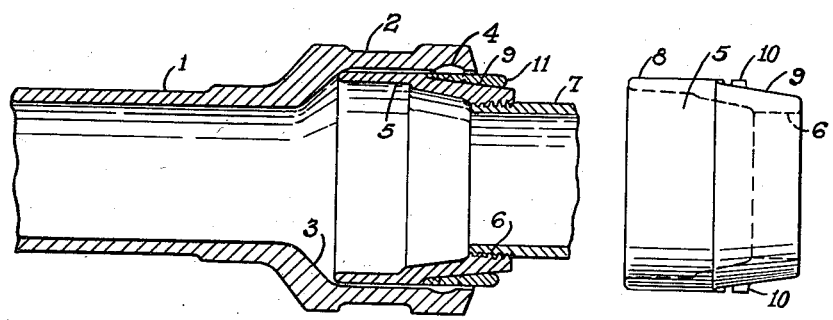
Fig.1.
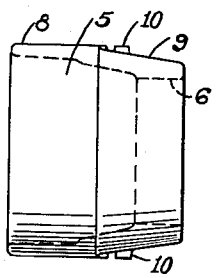
Fig.4.
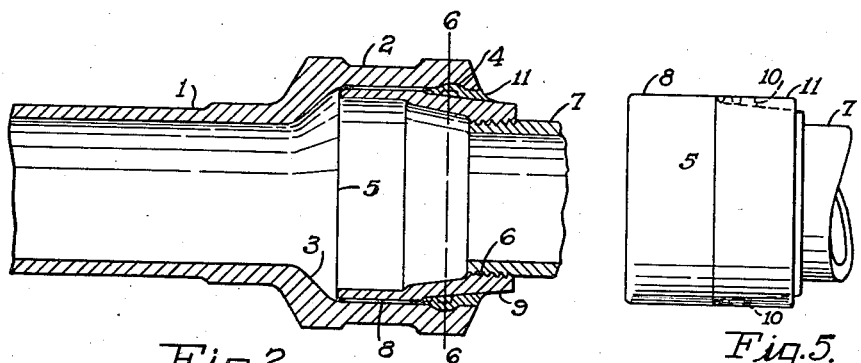
Fig.2.
Fig.5.
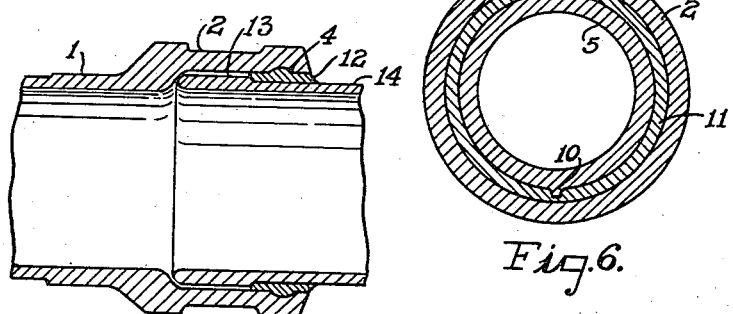
Fig.3.
Fig.6.
INVENTOR,
Ellsworth C. Halteman,
BY Howard S. Smith,
His ATTORNEY Patented Aug. 20, 1935

2,011,681

UNITED STATES PATENT OFFICE 2,011,681

CALKED PIPE JOINT

Ellsworth E. Halteman, Dayton, Ohio

Application March 29, 1934, Serial No. 717,988

1 Claim. (Cl. 285—115)

My invention relates to new and useful improvements in calked pipe joints and the like.

It is a principal object of my invention to provide a pre-cast lead ring on a pipe end or ferrule that is inserted within the bell end of a companion fitting to facilitate calking the joint between them.

It is another object of my invention to provide a calking means that eliminates the fire hazard incident to melting and pouring lead in a joint to be calked.

It is also another object of my invention to provide a calking means that is workable in any accessible position that would render the pouring of molten lead difficult and the resulting joint unreliable.

It is yet another object of my invention to provide a calking means that eliminates the hemp fiber or oakum packing customarily employed with poured lead calking and the impediments frequently formed within the pipe passage due to this process.

With my improved calking means these many faults are corrected and a speedier and more satisfactory joint is produced.

Also with my improved calking means, threaded ferrules may be secured in place in a bell fitting or hub end and retained against turning when a threaded pipe is screwed into the ferrule fitting.

Other important and incidental objects of my invention will be set forth in the following specification and the claim subjoined thereto.

In the accompanying drawing illustrating my invention in its preferred form, Figure 1 is a sectional view showing my calking means applied to a ferrule inserted in the bell end or hub of a cast pipe. Figure 2 is a sectional view of the fittings shown in Figure 1, after the calking operation is finished. Figure 3 is a sectional view showing my improved calking means applied to the end of a cast iron pipe and calked in place in the hub end of a companion member. Figure 4 is a side view of the threaded ferrule before the application thereto of the lead calking ring. Figure 5 is a side view of the ferrule disclosed in Figure 4, showing the lead ring in place. And Figure 6 is a cross sectional view taken on the line 6—6 of Figure 2.

Referring now to the drawing for a complete description of my invention, the numeral 1 designates the bell or hub end of a conventional cast iron pipe, such as is ordinarily used for waste drainage and venting in plumbing installations. Formed on the end of this pipe is a conventional hub 2, of greater internal diameter than the pipe 1 and joined therewith by a sloping seat portion 3. Also formed within the hub, adjacent its outer end, is a slight recess or depression 4.

As shown in Figure 1, there is inserted within the hub 2 a ferrule 5 of malleable iron or other suitable material, and having in its outer end a threaded opening 6 adapted to receive the threaded end of a connecting pipe 7.

The ferrule, as shown in Figures 1, 2 and 4, is formed at one end with a straight cylindrical shoulder 8 where it is received within the hub. At its outer portion the ferrule is formed with a slightly reduced tapering shoulder 9 terminating at the threaded end. Provided on diametrically opposite sides of the ferrule, and adjacent the inner end of the tapering shoulder 9, are serrated lugs 10, 10, whose outer faces are flush with the cylindrical shoulder 8.

Cast or molded upon this tapering shoulder 9 is a soft ring 11 of metal such as lead, and of substantially the same diameter as the shoulder 8 and in which the lugs 10, 10 are imbedded.

When the ferrule is inserted in the hub 2, and the soft metal ring 11 peened down or calked, the ring 11, due to its malleable nature, will be forced into the depression 4 to completely and tightly fill the space between the tapering shoulder 9 of the ferrule and the surrounding wall of the hub 2, as shown in Figures 2 and 6.

The extreme inner end of the ferrule 5 will be seated against the seat portion 3, to make the resulting connection not only leak-proof, but also mechanically strong to resist misalinement of its adjacent sections.

The lugs 10, 10 firmly embedded in the lead calking, will also effectively anchor the ferrule against turning when a connection is made to its threaded end 6.

In Figure 3 I have shown a similar calked joint effected by a lead ring 12 formed adjacent a raised shoulder or bead 13 on the end of a cast pipe section 14. This bead 13 and lead ring 12 are also inserted within the hub 2 in the same manner as previously described. When the calking operation is completed, a liquid tight and mechanically strong connection will result.

With the connections shown in Figures 1, 2 and 3, I have not used oakum or other packing, the packing ordinarily serving as an expedient to prevent the molten lead from escaping from the surrounding hub before it cools. It is thus seen that with my improved calking means I have provided a calking ring of uniform width or thickness, thus insuring concentricity of the joined members, and a joint of uniform strength and tightness.

My improved calking means not only expedites the work, but eliminates hazardous lead melting operations and the fires and burns incident thereto.

Having described my invention, I claim:

The combination of two pipe sections one having a bell end, and the other having a ferrule end adapted to enter the former to join the two sections together, said bell end formed at its outer portion with a slight internal recess, a straight shoulder on the inner end of the ferrule and a reduced tapering shoulder at its outer end, serrated lugs on the ferrule at the inner end of the tapering shoulder, and a soft metal ring formed on said ferrule over said lugs, and of substantially the same diameter as the straight shoulder, to be forced by calking into said recess to form a tight joint between the two sections.

ELLSWORTH C. HALTEMAN.